United States Patent
Henry et al.

(10) Patent No.: US 12,492,086 B2
(45) Date of Patent: *Dec. 9, 2025

(54) APPARATUS FOR STACKING TACO SHELLS

(71) Applicant: The Henry Group, Greenville, TX (US)

(72) Inventors: James Troy Henry, Greenville, TX (US); Brent E. Stevenson, Royse City, TX (US); Richard M. Toth, Plano, TX (US); Calan B. Ashmore, SulphurSprings, TX (US)

(73) Assignee: The Henry Group, Greenville, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/913,613

(22) Filed: Oct. 11, 2024

(65) Prior Publication Data

US 2025/0033905 A1    Jan. 30, 2025

Related U.S. Application Data

(63) Continuation of application No. 18/341,442, filed on Jun. 26, 2023, now Pat. No. 12,145,810.

(60) Provisional application No. 63/355,350, filed on Jun. 24, 2022.

(51) Int. Cl.
| | |
|---|---|
| *B65G 57/16* | (2006.01) |
| *B65G 43/08* | (2006.01) |
| *B65G 47/42* | (2006.01) |
| *B65G 57/03* | (2006.01) |

(52) U.S. Cl.
CPC ........... *B65G 57/165* (2013.01); *B65G 43/08* (2013.01); *B65G 47/42* (2013.01); *B65G 57/035* (2013.01); *B65G 2201/0202* (2013.01)

(58) Field of Classification Search
CPC ......... B65B 23/00; B65B 35/50; B65B 67/04; B65B 5/106; B65G 47/42; B65G 57/035; B65G 57/245; B65G 57/165; B65G 47/82; B65G 25/12; B65H 2301/42146; Y10S 414/105; Y10S 414/114
USPC ............ 414/789.9, 790.3, 798.7, 798.4, 926; 198/370.02, 370.07, 370.08, 487.1; 53/473, 540

See application file for complete search history.

(56) References Cited

U.S. PATENT DOCUMENTS

| | | | | |
|---|---|---|---|---|
| 3,037,610 | A * | 6/1962 | Morton | A21C 15/00 |
| | | | | 198/429 |
| 3,224,550 | A * | 12/1965 | Nigrelli | B65B 35/54 |
| | | | | 198/444 |
| 3,655,186 | A | 4/1972 | Bayha | |
| 3,915,317 | A * | 10/1975 | White | B65G 57/03 |
| | | | | 221/310 |
| 3,959,951 | A | 6/1976 | Paules | |
| 4,367,619 | A | 1/1983 | Lorsch | |

(Continued)

*Primary Examiner* — Gregory W Adams

(57) ABSTRACT

A taco stacking apparatus comprises a conveyor assembly for supporting and moving taco shells along a predefined pathway. The conveyor assembly defines an opening in the predefined pathway that enables the taco shells to pass through the conveyor assembly. A stacking receptacle defines a channel for receiving taco shells passed through the opening in the predefined pathway of the conveyor assembly. A plunger assembly passes a taco shell through the opening in the predefined pathway of the conveyor assembly to the stacking receptacle.

20 Claims, 5 Drawing Sheets

(56) References Cited

U.S. PATENT DOCUMENTS

| | | | |
|---|---|---|---|
| 4,529,119 A | | 7/1985 | Granzow et al. |
| 4,709,535 A | * | 12/1987 | Mahaffy ............... B65B 31/021 |
| | | | 53/247 |
| 4,753,336 A | | 6/1988 | Taylor et al. |
| 5,161,665 A | * | 11/1992 | Cragun ................ B65G 47/682 |
| | | | 198/452 |
| 5,195,305 A | | 3/1993 | Dambrosio et al. |
| 6,205,745 B1 | * | 3/2001 | Dudderar .......... H01L 21/67132 |
| | | | 414/416.01 |
| 6,217,276 B1 | | 4/2001 | Hohmann et al. |
| 6,548,092 B2 | | 4/2003 | Zelander et al. |
| 6,918,737 B2 | | 7/2005 | Golden |
| 7,059,599 B2 | | 6/2006 | Lewis |
| 7,377,086 B2 | | 5/2008 | Cremers et al. |
| 7,858,130 B2 | * | 12/2010 | Malenke ................ B65G 59/04 |
| | | | 426/231 |
| 9,865,118 B2 | | 1/2018 | Angus |
| 12,145,810 B2 | * | 11/2024 | Henry ..................... B65B 35/50 |
| 2010/0135762 A1 | * | 6/2010 | Ryf .................... B65H 31/3081 |
| | | | 414/788.9 |
| 2013/0294878 A1 | * | 11/2013 | Anderson ............... B65B 35/50 |
| | | | 414/788.1 |
| 2023/0416021 A1 | * | 12/2023 | Henry .................... B65G 43/08 |

\* cited by examiner

APPARATUS FOR STACKING TACO SHELLS

CROSS-REFERENCE TO RELATED APPLICATIONS

This application is a continuation of U.S. patent application Ser. No. 18/341,442, filed Jun. 26, 2023, entitled APPARATUS FOR STACKING TACO SHELLS, which claims benefit of U.S. Provisional Application No. 63/355,350, filed Jun. 24, 2022, entitled APPARATUS FOR STACKING TACO SHELLS, the specifications of which are each incorporated by reference herein in their entirety.

TECHNICAL FIELD

The present invention relates to food packaging, and more particularly to an apparatus for stacking taco shells for packaging.

BACKGROUND

Tacos have become a staple cuisine both in commercial restaurants and in many homes. Although many of the ingredients may differ from place to place, one critical element is the taco shell which can come in a variety of flavors and types including soft and hard shells. As a result, there is a high demand for taco shells. Conventional methods of preparing and distributing taco shells typically involve manually stacking the shells before placing them in packaging materials. These conventional methods tend to be slow and inefficient.

The present disclosure is directed to an improved system and method for stacking and packaging taco shells. By utilizing a specialized conveyor system, freshly cooked taco shells may be quickly, efficiently, and safely arranged without the need for manual stacking. Additionally, sensors can be used to evaluate each taco shell and to discard ones not meeting particular standards thereby providing packaged tacos of a consistent quality.

SUMMARY

The present invention, as disclosed and described herein, in one aspect thereof comprises a taco stacking apparatus comprises a conveyor assembly for supporting and moving taco shells along a predefined pathway. The conveyor assembly defines an opening in the predefined pathway that enables the taco shells to pass through the conveyor assembly. A stacking receptacle defines a channel for receiving taco shells passed through the opening in the predefined pathway of the conveyor assembly. A plunger assembly passes a taco shell through the opening in the predefined pathway of the conveyor assembly to the stacking receptacle.

BRIEF DESCRIPTION OF THE DRAWINGS

For a more complete understanding, reference is now made to the following description taken in conjunction with the accompanying Drawings in which.

DETAILED DESCRIPTION

Figure 1:
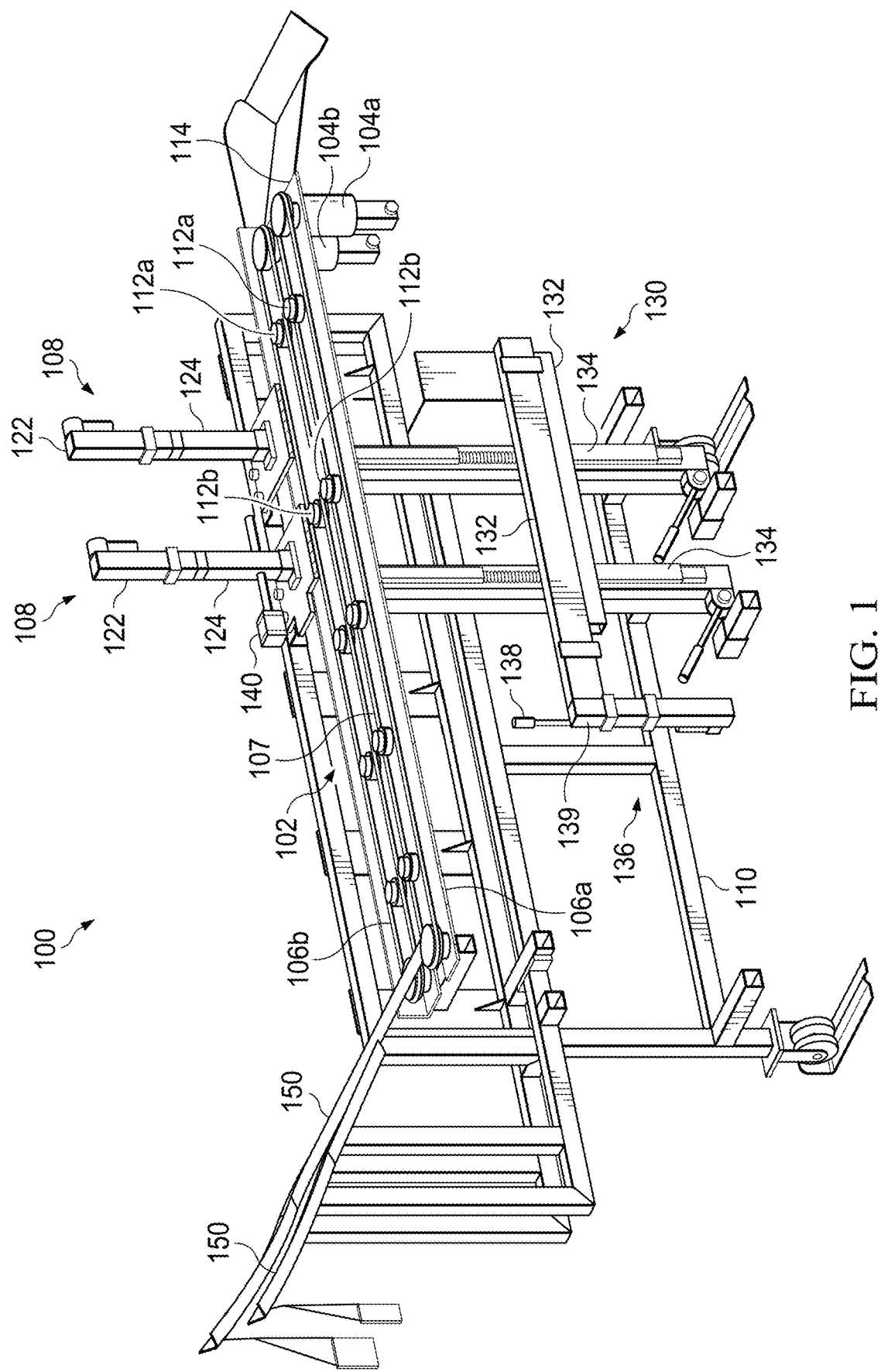
FIG. 1 illustrates a first perspective view of the apparatus for stacking taco shells.

Referring now to the drawings, wherein like reference numbers are used herein to designate like elements throughout, the various views and embodiments of apparatus for stacking taco shells are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Figure 2:
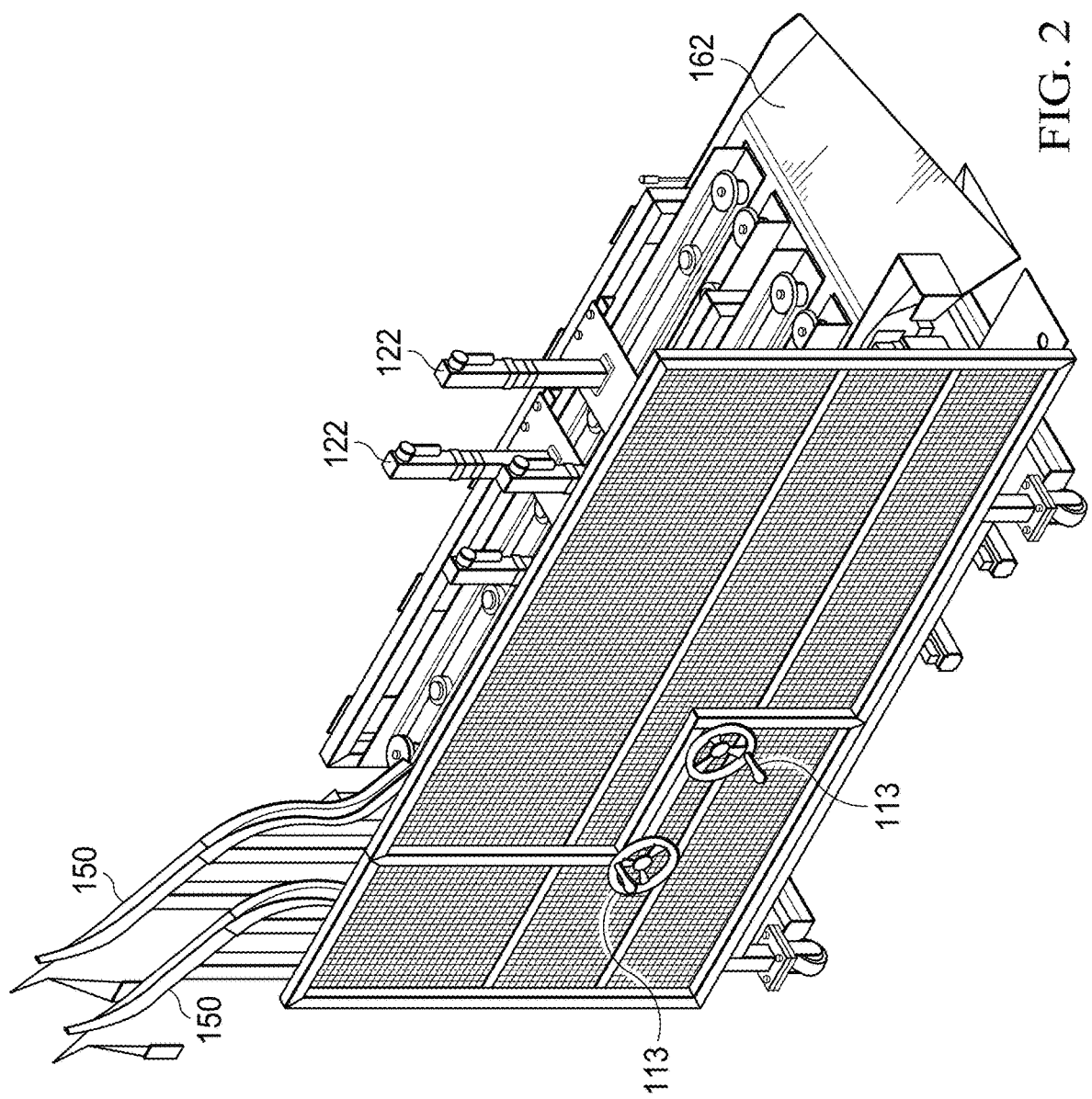
FIG. 2 illustrates a second perspective view of the apparatus for stacking taco shells.

Referring now to the drawings, and more particularly to FIGS. 1 and 2, there are illustrated perspective views of a taco stacking system 100. The taco stacking system 100 in accordance with various embodiments of the present disclosure includes a conveyor assembly 102. The conveyor assembly 102 may include at least one conveyor motor 104 associated with each at least one suspension element 106, a plunger assembly 108, and a frame 110. Each of the at least one conveyor motor 104, at least one suspension element 106, and plunger assembly 108 may be disposed upon, or secured to, the frame 110.

In some embodiments, as seen in FIGS. 1 and 2, the conveyor assembly 102 may further include at least one rotating member 112. The at least one conveyor motor 104 may be arranged at a second end 114 of frame 110. The at least one rotating member 112 may comprise a first set of rotating members 112a disposed along frame 110 such that a first suspension element 106a of the at least one suspension element 106 may be operably coupled to both the first set of rotating members 112a and a first conveyor motor 104a of the at least one conveyor motor 104. Additionally, a second conveyor motor 104b of the at least one conveyor motor 104 may be disposed at the second end 114 substantially parallel to the first conveyor motor 104a. A second set of rotating members 112b may be disposed along frame 110, substantially parallel to the first set of rotating members 112a, such that a second suspension element 106b of the at least one suspension element 106 may be operably coupled to both the second set of rotating members 112b and the second conveyor motor 104b. First conveyor motor 104a is configured to cause rotation in a direction opposite that of second conveyor motor 104b such that the relative rotations caused by each conveyor motor 104 will cause their respective suspension element 106 to travel in the same direction with respect to an adjacent suspension element around their respective rotating members 112.

When coupled to the conveyor motors 104 and rotating members 112, first suspension element 106a and second suspension element 106b define an open space 107 between them configured to accommodate the traversal of a taco shell (not shown) along conveyor assembly 102 by securely holding the taco shell between the suspension elements 106 as the rotations caused by first conveyor motor 104a and second conveyor motor 104b urge the taco shell forward through its frictional contact with the suspension elements. The width between the suspension elements 106 may be adjusted by turning adjustment wheels 113 to adjust the location of the conveyor motors 104 and rotating member pairs 112 to make a larger or smaller space 107 between the suspension elements 106 to support different sized taco shells. The suspension elements 106 may be belts, bands or any other continuous component capable of supporting the taco shells.

Figure 3A:
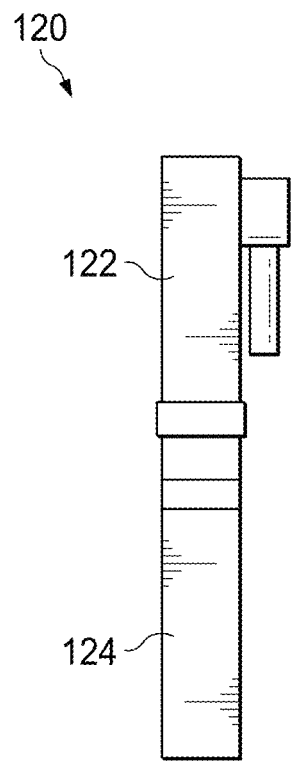
FIG. 3A illustrates a side view of a first embodiment of the plunger mechanism.
Figure 3B:
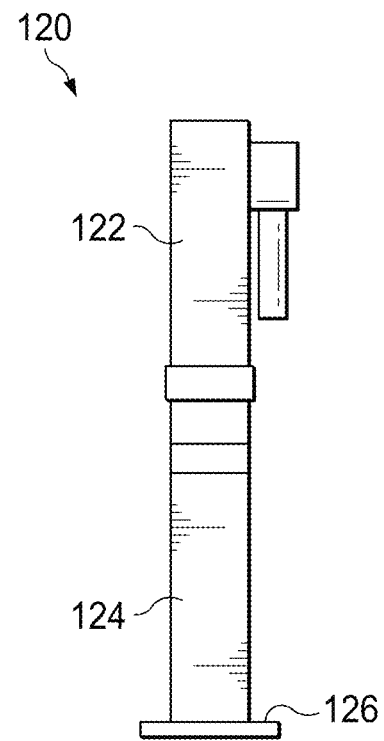
FIG. 3B illustrates a side view of a second embodiment of the plunger mechanism.

Referring now also to FIGS. 3A and 3B, the plunger assembly 108 may also be secured to frame 110 such that it is arranged, or partially arranged, substantially above the open space defined between first suspension element 106a and second suspension element 106b. The plunger assembly 108 is rated for one-hundred twenty taco shells per minute per lane defined by a pair of suspension elements. Plunger assembly 108 includes a plunger actuator 122 and a plunger 124 operably coupled to the plunger actuator. Plunger actuator 122 may be a servo motor configured to cause plunger 124 to bias downward such that plunger contacts a taco shell being transported by conveyor assembly 102 and cause the taco shell to be pushed between and below the suspension elements 106. Referring now to FIG. 3B, there is illustrated a plunger 124 configured with a longer contact body or surface 126 to more evenly a apply downward force to a surface of the taco shell and avoid breakage of the taco shell.

Figure 4:
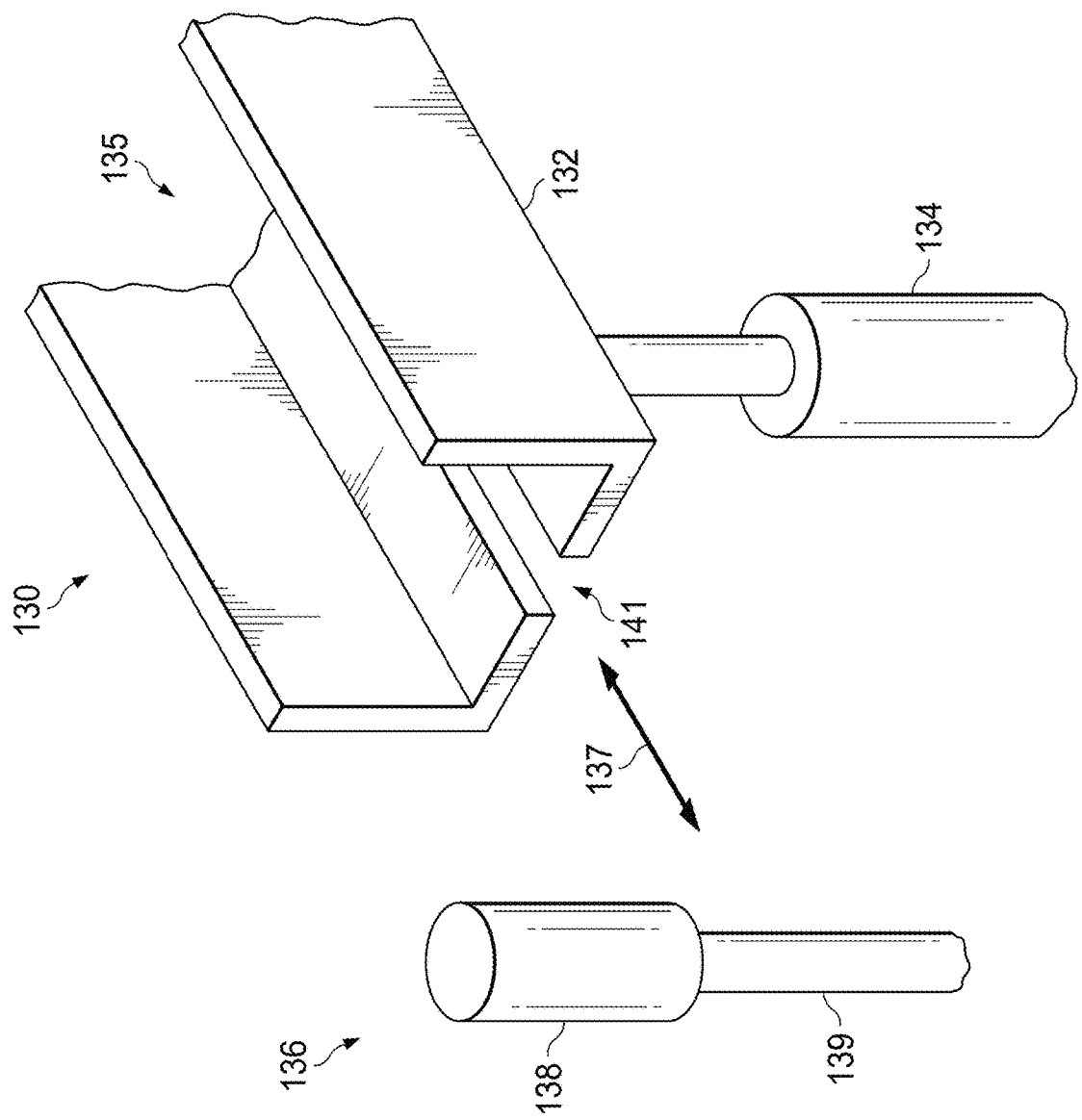
FIG. 4 illustrates a perspective view of the stacking assembly.

Referring now also to FIG. 4, when pushed through and below the suspension elements, a taco shell is delivered to a stacking assembly 130. Stacking assembly 130 is secured to the frame 110 such that it is arranged, or partially arranged, below the open space 107 defined between first suspension element 106a and second suspension element 106b. Stacking assembly 130 may include a stacking receptacle 132 that is operably coupled to a receptacle movement actuator 134. Stacking receptacle 132 is shaped, or otherwise configured with a recess or other geometry, to accommodate the secure placement and stacking of the taco shell on other taco shells. For example, stacking receptacle 132 may have or otherwise define a V-shaped, U-shaped, or rectangular open channel for receiving taco shells. For purposes of illustration a U-shaped channel is illustrated with respect to FIG. 4. Receptacle movement actuator 134 may be a servo motor configured to cause stacking receptacle 132 to raise toward or lower from the open space between the suspension elements 106. Stacking receptacle 132 may be disposed substantially beneath plunger 124 such that a taco shell that is pushed through and below the suspension elements 106 is received by stacking receptacle 132. The receptacle movement actuator 134 lowers the stacking receptacle 132 as taco shells are added to the stack within the staking receptacle to make room between the stacked taco shells and the bottom of the suspension elements 106.

Further embodiments may include a dispensing assembly 136. Dispensing assembly 136 is secured to frame 110 such that the dispensing assembly is arranged, or partially arranged, below stacking assembly 130. Dispensing assembly 136 may include a biasing surface 138 and a dispensing actuator 139 that is operably coupled to the biasing surface 138. Biasing surface 138 may have a shape that corresponds to, or may otherwise be received into, stacking receptacle 132.

Dispensing actuator 139 is configured to cause biasing surface 138 to move along a substantially horizontal axis 137, enter into the stacking receptacle 132, and push through an open channel 135 and slot 139 defined by, or in, stacking receptacle 132 and the interior of the stacking receptacle. Biasing surface 138 is configured to push any tacos contained in stacking receptacle 132 out of the stacking receptacle and toward a packaging station.

Referring now back to FIG. 1, further embodiments of the present disclosure may also include a sensor 140 configured to sense, or otherwise gather data, for taco shells on conveyor assembly 102. The sensor 140 may be secured to frame 110 and positioned before plunger assembly 120 on the conveyor track defined by the suspension elements 106 such that a taco shell must first pass by sensor 140 before reaching plunger assembly 120. Sensor 140 may be a camera configured to detect the quality, shape, or other attributes of the taco shell. The sensor 140 may detect things such as a crack in the taco shell or j-shaped taco shells indicating a broken or incomplete taco shell. The number of cracks and the amount of a j-shape in a taco shell that is allowed before rejection by the system can be programmed by the system user.

A taco shell entering conveyor assembly 102 may be substantially freshly cooked and still somewhat malleable relative the final, dried state of the taco shell. The taco shell may be folded over, or otherwise disposed, on a line that feeds into conveyor assembly 102. When so disposed, the taco shell may be substantially upside down having its two sides with an open space between them facing downward. The line may slope downward into conveyor assembly 102. Conveyor assembly 102 may also include an orientation track 150 configured to cause the taco shell to change position before reaching the suspension elements 106. Orientation track 150 may have two side walls and one base surface that all define a pathway. The pathway may be angled at the point that the taco shell first enters orientation track 150 such that the naturally sliding of the taco shell along the sloped line into orientation track 150 causes the taco shell to rotate up to 180 degrees into an upright position before reaching the end of the pathway. The sloped line may be disposed partially within orientation track 150 such that the contact of the taco shell with the exterior surface of one of the side walls causes the rotation of the taco shell as the taco shell attempts to continue moving along the sloped line before being received by the pathway defined by the interior surfaces of the two side walls.

Figure 5:
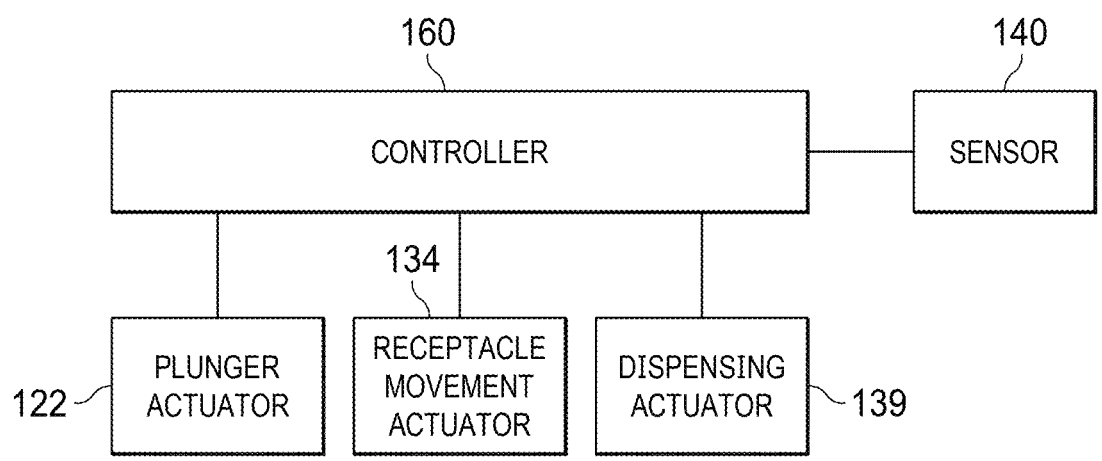
FIG. 5 illustrates a block diagram of the controller, sensors and actuators of the taco stacking apparatus.

Referring now to FIG. 5, there is illustrated a block diagram of the control system for the taco stacking system 100. The conveyor assembly 102 may also include a control apparatus 160. Control apparatus 160 may be a computer/processor capable of regulating the servo motors and processing sensor data from sensor 140. Control apparatus 160 interprets data from sensor 140 and causes plunger actuator 122 to actuate only when a taco shell of a defined quality is detected. If a taco shell does not meet the set quality threshold, the taco shell may continue to travel along the conveyor track and be delivered to a discard chute 162 (FIG. 2) or receptacle. Shells may be further manually inspected in the discharge chute 162 prior to disposal. Control apparatus 102 may be further configured to actuate receptacle movement actuator 134 when a defined number of taco shells have been stacked in stacking receptacle 132. Control apparatus 160 may be even further configured to actuate dispensing actuator 139 when stacking receptacle 132 has been lowered into the horizontal axis 137 of biasing surface 138.

Conveyor assembly 102 may have more than one plunger 124 and stacking assembly 130. Control apparatus 160 may be configured to regulate the use of the servo motors such that if one stacking assembly 130 of a plurality of stacking assemblies is being lowered, that its corresponding plunger assembly 120 ceases to actuate while another plunger assembly becomes active and begins stacking taco shells in another stacking assembly of the plurality of stacking assemblies. Additionally, conveyor assembly 102 may include multiple conveyor lanes each configured and having the structures set out in the previously described embodiments.

It will be appreciated by those skilled in the art having the benefit of this disclosure that this apparatus for stacking taco shells provides an improved manner for stacking taco shells for packaging. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A taco stacking apparatus, comprising:
    a conveyor assembly for supporting and moving taco shells along a predefined pathway, wherein the conveyor assembly defines an opening in the predefined pathway that enables the taco shells to pass through the conveyor assembly;
    a stacking receptacle defining a channel for receiving taco shells passed through the opening in the predefined pathway of the conveyor assembly; and
    a plunger assembly for passing a taco shell through the opening in the predefined pathway of the conveyor assembly to the stacking receptacle.

2. The taco stacking apparatus of claim 1, wherein the conveyor assembly further comprises a motor for driving the conveyor assembly to move the taco shells along the predefined pathway in a first direction.

3. The taco stacking apparatus of claim 1 further comprising an actuator associated with the conveyor assembly for controlling a size of the opening in the predefined pathway.

4. The taco stacking apparatus of claim 1, wherein the plunger assembly further comprises:
    a plunger for moving between a first position and a second position, wherein movement of the plunger from the first position to the second position moves the taco shell through the opening in the predefined pathway of the conveyor assembly to the stacking receptacle; and
    a plunger actuator for moving the plunger from the first position to the second position responsive to a control signal.

5. The taco stacking apparatus of claim 1 further comprising a dispensing assembly for removing the stack of taco shells from the stacking receptacle.

6. The taco stacking apparatus of claim 5, wherein the dispensing assembly further comprises:
    a biasing member for contacting the stack of taco shells within the stacking receptacle; and
    a biasing member actuator for moving the biasing member along a horizontal axis with respect to the stacking receptacle to dispense the stack of taco shells from the stacking receptacle.

7. The taco stacking apparatus of claim 1 further comprising:
    a sensor for detecting a condition of the taco shell on the conveyor assembly and generating a control signal responsive to the detected condition of the taco shell;
    wherein the plunger assembly is actuated to transfer the taco shell from the conveyor assembly to the stacking receptacle responsive to the control signal indicating a good taco shell; and
    wherein the plunger assembly is not actuated to transfer the taco shell from the conveyor assembly responsive to the control signal indicating a bad taco shell.

8. The taco stacking apparatus of claim 1 further comprising an orientation track located before the conveyor assembly for orienting an open side of the taco shell in an upward orientation.

9. The taco stacking apparatus of claim 1 further comprising a stacking receptacle actuator for lowering the stacking receptacle as additional taco shells are added to a stack of taco shells.

10. A taco stacking apparatus, comprising:
    a first suspension element and a second suspension element for supporting taco shells on a predefined pathway, wherein the first suspension element and the second suspension element are separated by a selected distance that enables the first suspension element and the second suspension element to support the taco shells on the predefined pathway;
    a stacking receptacle defining a channel for receiving taco shells transferred from the first suspension element and the second suspension element; and
    a plunger assembly for transferring a taco shell from the first suspension element and the second suspension element to the stacking receptacle.

11. The taco stacking apparatus of claim 10 further comprising a plurality of pairs of support rollers located along a length of the first suspension element and the second suspension element for supporting the first and second suspension elements.

12. The taco stacking apparatus of claim 10 further comprising:
    a lane width actuator associated with the first suspension element and the second suspension element; and
    wherein the selected distance between the first suspension element and the second suspension element is adjustable responsive to movement of the lane width actuator.

13. The taco stacking apparatus of claim 10, wherein the plunger assembly further comprises a contact member connected to a bottom of the plunger assembly to increase contact with the taco shell.

14. The taco stacking apparatus of claim 10 further comprising a controller for receiving a detection signal of a sensor and generating a control signal responsive thereto, wherein the controller further actuates a stacking receptacle actuator responsive to the taco shell being stacked into the stacking receptacle.

15. The taco stacking apparatus of claim 10 further comprising an orientation track located before the first suspension element and the second suspension element for orienting an open side of the taco shell in an upward orientation.

16. A taco stacking apparatus, comprising:
    a conveyor assembly for supporting and moving taco shells along a predefined pathway, wherein the conveyor assembly defines an opening therein that enables the taco shells to pass through the conveyor assembly;
    an orientation track located before the conveyor assembly for orienting an open side of the taco shell in an upward orientation;
    a stacking receptacle defining a channel for receiving taco shells passed through the opening from the conveyor assembly in the upward orientation;

a plunger assembly for passing a taco shell through the opening of the conveyor assembly to the stacking receptacle, wherein the plunger assembly further comprises:
a plunger for moving between a first position and a second position, wherein movement of the plunger from the first position to the second position causes the plunger to contact the taco shell from the open side of the taco shell and move the taco shell through the opening of the conveyor assembly to the stacking receptacle;
a plunger actuator for moving the plunger from the first position to the second position responsive to a control signal; and
a dispensing assembly for removing the stack of taco shells from the stacking receptacle.

17. The taco stacking apparatus of claim 16 further comprising a contact member connected to a bottom of the plunger to increase contact with the taco shell.

18. The taco stacking apparatus of claim 16, wherein the dispensing assembly further comprises:
a biasing member for contacting the stack of taco shells within the stacking receptacle; and
a biasing member actuator for moving the biasing member along a horizontal axis with respect to the stacking receptacle to dispense the stack of taco shells from the stacking receptacle.

19. The taco stacking apparatus of claim 18, wherein the stacking receptacle further defines a slot in a base thereof enabling the biasing member to move horizontally down the stacking receptacle to remove the stack of taco shells from the stacking receptacle.

20. The taco stacking apparatus of claim 18 further comprising:
a sensor for detecting a condition of the taco shell on the conveyor assembly and generating a control signal responsive to the detected condition of the taco shell;
wherein the plunger assembly is actuated to transfer the taco shell from the conveyor assembly to the stacking receptacle responsive to the control signal indicating a good taco shell; and
wherein the plunger assembly is not actuated to transfer the taco shell from the conveyor assembly responsive to the control signal indicating a bad taco shell.

* * * * *